(12) United States Patent
Song et al.

(10) Patent No.: US 11,458,627 B2
(45) Date of Patent: Oct. 4, 2022

(54) METHOD AND SYSTEM OF ROBOT FOR HUMAN FOLLOWING

(71) Applicant: NATIONAL CHIAO TUNG UNIVERSITY, Hsinchu (TW)

(72) Inventors: Kai-Tai Song, New Taipei (TW); Cheng-An Yang, Taichung (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 123 days.

(21) Appl. No.: 17/069,843

(22) Filed: Oct. 13, 2020

(65) Prior Publication Data
US 2022/0048188 A1 Feb. 17, 2022

(30) Foreign Application Priority Data
Aug. 13, 2020 (TW) .................................. 109127605

(51) Int. Cl.
*B25J 9/16* (2006.01)
*B25J 13/08* (2006.01)
*G05D 1/02* (2020.01)

(52) U.S. Cl.
CPC ........... *B25J 9/1666* (2013.01); *B25J 9/1653* (2013.01); *B25J 9/1676* (2013.01); *B25J 9/1697* (2013.01); *B25J 13/088* (2013.01); *G05D 1/0212* (2013.01)

(58) Field of Classification Search
CPC ...... B25J 9/1666; B25J 9/1653; B25J 9/1676; B25J 9/1697; B25J 13/088; B25J 5/007;
(Continued)

(56) References Cited

U.S. PATENT DOCUMENTS

| | | | | |
|---|---|---|---|---|
| 5,545,960 A | * | 8/1996 | Ishikawa | .............. G05D 1/0255 318/587 |
| 7,211,980 B1 | | 5/2007 | Bruemmer et al. | |

(Continued)

FOREIGN PATENT DOCUMENTS

| | | |
|---|---|---|
| CN | 103092204 B | 4/2016 |
| CN | 105955268 A | 9/2016 |

(Continued)

OTHER PUBLICATIONS

Woo-Han Yun et al., "Person following with obstacle avoidance based on multi-layered mean shift and force field method", 2010 IEEE International Conference on Systems, Man and Cybernetics, pp. 3813-3816.
(Continued)

*Primary Examiner* — Abby Y Lin
*Assistant Examiner* — Dylan M Katz
(74) *Attorney, Agent, or Firm* — CKC & Partners Co., LLC

(57) ABSTRACT

A system of a robot for human following includes the robot faced toward a first direction. The robot includes a detecting device, a controlling device and a mobile device. The detecting device detects a target human and a obstacle. The controlling device generates a first parameter according to a first vector between the target human and the robot, generates a second parameter according to a second vector between the obstacle and the robot, and generates a driving command according to a first resultant force parameter generated from the first parameter and the second parameter and an angle value between the first direction and the first vector to drive the robot. The mobile device performs the driving command to enable the robot dodging the at least one obstacle and following the target human, simultane-
(Continued)

ously. A controlling method of a robot for human following is also disclosed herein.

8 Claims, 12 Drawing Sheets

(58) Field of Classification Search
CPC ... B25J 11/009; G05D 1/0212; G05D 1/0246; G05D 2201/0216; G05D 2201/0206; G05D 1/12; G06V 20/58; G06V 2201/07; G06T 2207/30196
See application file for complete search history.

(56) References Cited

U.S. PATENT DOCUMENTS

| | | | |
|---|---|---|---|
| 10,180,683 B1 | 1/2019 | Libman et al. | |
| 2016/0184990 A1* | 6/2016 | Song | G05D 1/024 701/2 |
| 2016/0188977 A1* | 6/2016 | Kearns | G06V 40/172 348/113 |
| 2020/0117211 A1* | 4/2020 | Paglieroni | G05D 1/0217 |
| 2020/0257311 A1* | 8/2020 | Kim | G05D 1/0295 |
| 2020/0334850 A1* | 10/2020 | Ross | G08B 25/016 |

FOREIGN PATENT DOCUMENTS

| | | |
|---|---|---|
| CN | 106371459 A | 2/2017 |
| CN | 108351654 A | 7/2018 |
| CN | 109557929 A | 4/2019 |
| CN | 109947119 A | 6/2019 |
| CN | 110244772 A | 9/2019 |
| CN | 111089590 A | 5/2020 |
| CN | 111368755 A | 7/2020 |
| TW | I558525 B | 11/2016 |
| TW | I611278 B | 1/2018 |
| TW | 201825037 A | 7/2018 |
| TW | 201947338 A | 12/2019 |

OTHER PUBLICATIONS

Beom-Jin Lee et al., "Robust Human Following by Deep Bayesian Trajectory Prediction for Home Service Robots", 2018 IEEE International Conference on Robotics and Automation (ICRA), May 21-25, 2018, pp. 7189-7195.

Jau-Woei Perng et al., "Vision-Based human following and obstacle avoidance for an autonomous robot in intersections", 2012 Sixth International Conference on Genetic and Evolutionary Computing, pp. 496-499.

* cited by examiner

METHOD AND SYSTEM OF ROBOT FOR HUMAN FOLLOWING

CROSS-REFERENCE TO RELATED APPLICATION

This application claims priority to Taiwan Application Serial Number 109127605, filed Aug. 13, 2020, which is herein incorporated by reference in its entirety.

BACKGROUND

Technical Field

The present disclosure relates to a robot. More particularly, the present disclosure relates to a method and a system of robot for human following.

Description of Related Art

Service robots replace labors gradually to provide clients and users various services, in order to improve problems of manpower shortage. In many applications of self-propelled service robots, people want to interact with a robot in a simple and intuitive way, to obtain desired services. People hope that the robot can remain at a surrounding of the user stably to facilitate the user to operate the robot. The robot needs to work in a crowded and dynamic circumstance, so the robot should be able to avoid obstacles in the circumstance without interrupting missions.

SUMMARY

The present disclosure provides a system of a robot for human following. The system includes the robot facing toward a first direction. The robot includes a detecting device, a controlling device and a mobile device. The detecting device is configured to detect a target human and at least one obstacle. The controlling device is configured to generate a first parameter according to a first vector between the target human and the robot, generate a second parameter according to at least one second vector between the at least one obstacle and the robot, and generate a driving command according to a first resultant force parameter generated from the first parameter and the second parameter and an angle value between the first direction and the first vector to drive the robot. The mobile device is configured to perform the driving command of the controlling device for the robot, to enable the robot dodging the at least one obstacle and following the target human simultaneously.

The present disclosure provides a controlling method of a robot for human following. The method includes: identifying a target human in an image detected by the robot according to a pre-stored database related to the target human; performing calculation to obtain an angle value between a first direction and a first vector according to the first direction which the robot moving toward and the first vector between the robot and the target human; performing calculation to obtain a resultant force parameter according to the first vector, the angle value and at least one second vector between at least one obstacle and the robot; adjusting a moving action of the robot according to the resultant force parameter and the angle value to enable the robot dodging the at least one obstacle and following the target human simultaneously.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
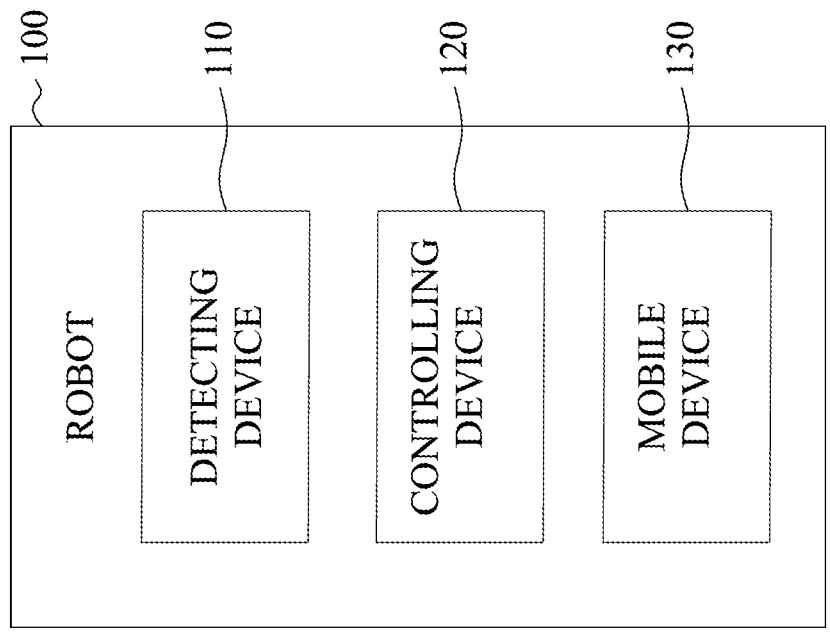
FIG. 1 is a schematic diagram of a robot illustrated according to one embodiment of this disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram of a robot illustrated according to one embodiment of this disclosure. As illustratively shown in FIG. 1, a robot 100 includes a detecting device 110, a controlling device 120 and a mobile device 130. The detecting device 110 is configured to detect a surrounding circumstance of the robot 100, especially a target human and obstacles in the surrounding circumstance. The controlling device 120 is configured to calculate a resultant force parameter according to related information of the target human and the obstacles to control the mobile device 130. The mobile device 130 is configured to drive the robot 100 according to the resultant force parameter, such that the robot 100 is able to follow the target human stably at the same instant that the robot 100 is dodging the obstacles. In some embodiments, the obstacles include humans other than the target human.

Figure 8:
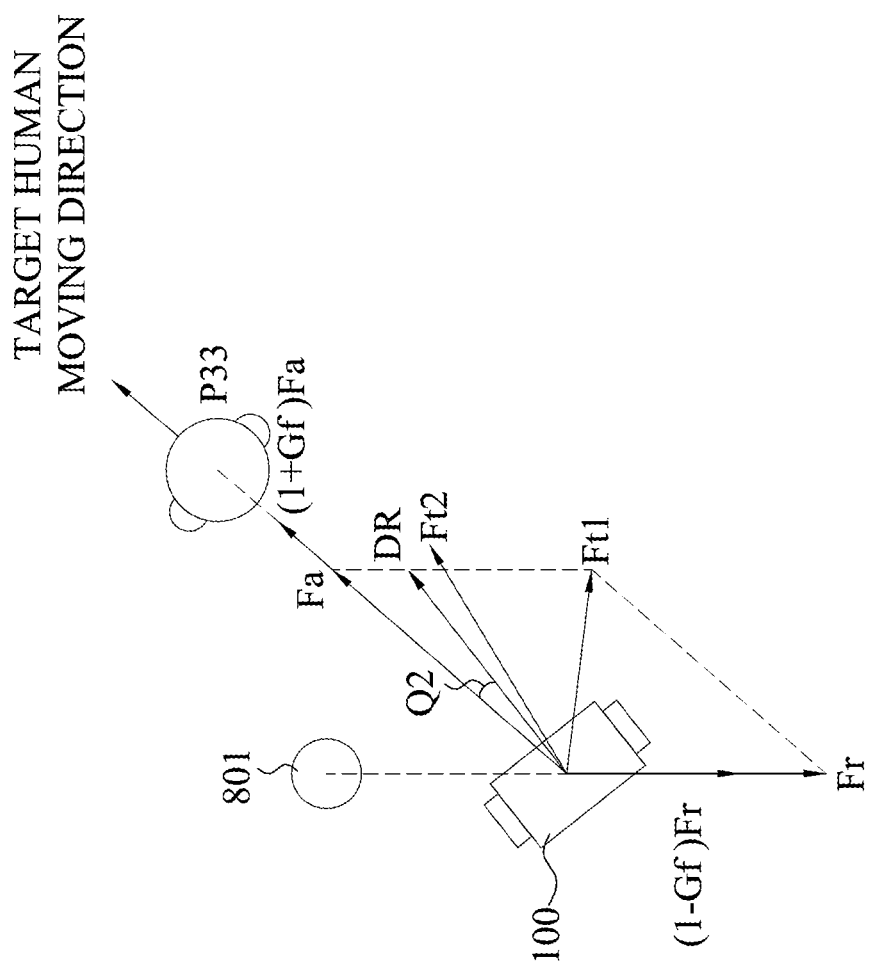
FIG. 8 is a schematic diagram of a robot following a target human and dodging an obstacle simultaneously illustrated according to one embodiment of this disclosure.

For example, in some embodiments, the detecting device 110 is configured to detect locations of a target human P33 and an obstacle 801 in FIG. 8. The controlling device 120 is configured to calculate a resultant force parameter Ft in equations described below according to related information of the target human P33 and the obstacle 801. The mobile device 130 is configured to drive the robot 100 according to the resultant force parameter Ft, such that the robot 100 is able to follow the target human P33 stably at the same instant that the robot 100 is dodging the obstacle 801.

In some embodiments, the detecting device 110 includes RGB-D (red, green, blue and depth) camera or other types of detecting device. In some embodiments, the controlling device 120 includes a computer, a memory, a hard drive, a processor or other device that is able to perform calculations or assist calculations. In some embodiments, the mobile device 130 includes a tire, an electric motor, an engine or other device that is able to move the robot 100. The present disclosure is not limited to the embodiments described above. Various types of the detecting device 110, the controlling device 120 and the mobile device 130 are contemplated as being within the scope of the present disclosure.

Figure 2A:
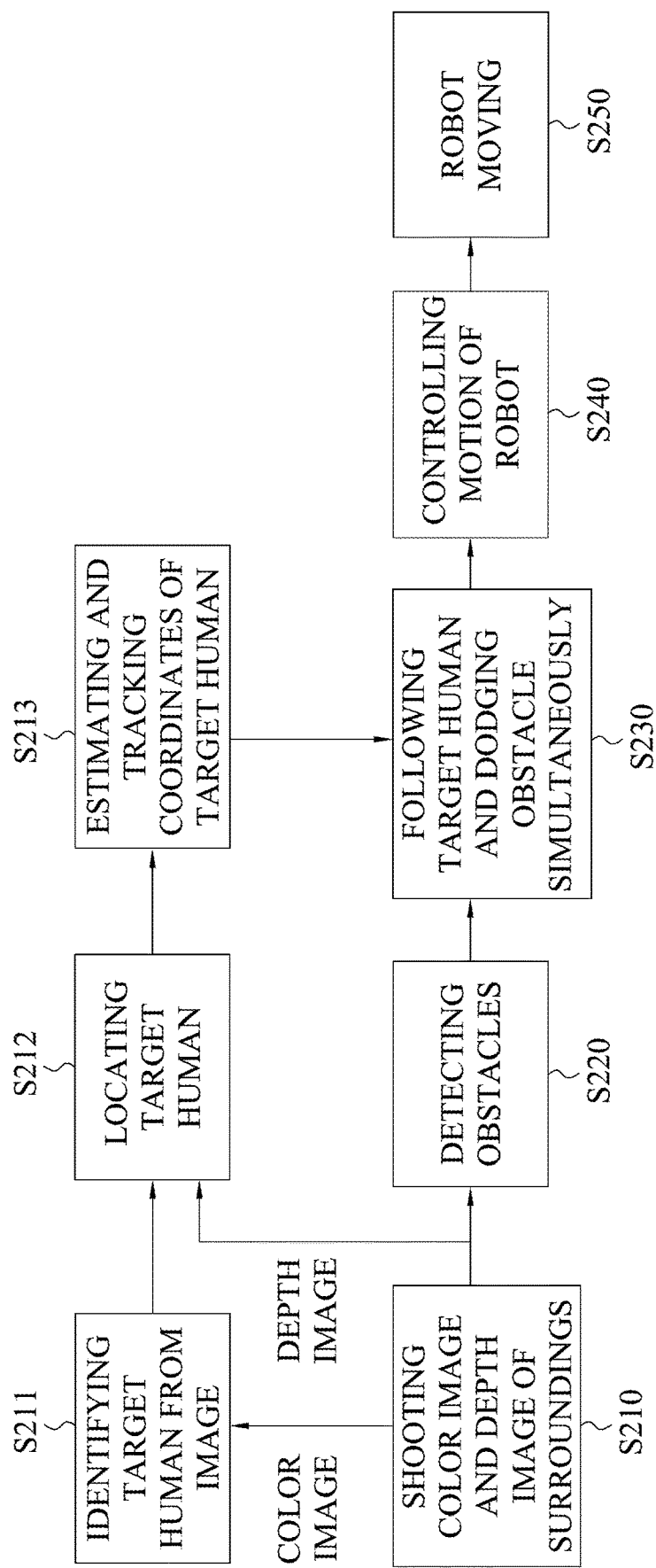
FIG. 2A is a flowchart of a controlling method of a robot illustrated according to one embodiment of this disclosure.

FIG. 2A is a flowchart of a controlling method of a robot illustrated according to one embodiment of this disclosure. FIG. 2A includes operations S210-S213, S220, S230, S240 and S250. In some embodiments, the operations S210 to S250 illustrate details of operations from the robot 100 detecting the target human P33 and the obstacle 801 until the robot 100 moving and following the target human P33 and dodging the obstacle 801 simultaneously.

At operation S210, the detecting device 110 is configured to detect circumstance information, such as shooting a color image and a depth image of surroundings. At operation S211, the robot 100 identifies the target human according to the color image shot at operation S210. For example, the detecting device 110 shoots an image 311 in FIG. 3, and identifies the target human P33 according to the image 311.

Figure 2B:
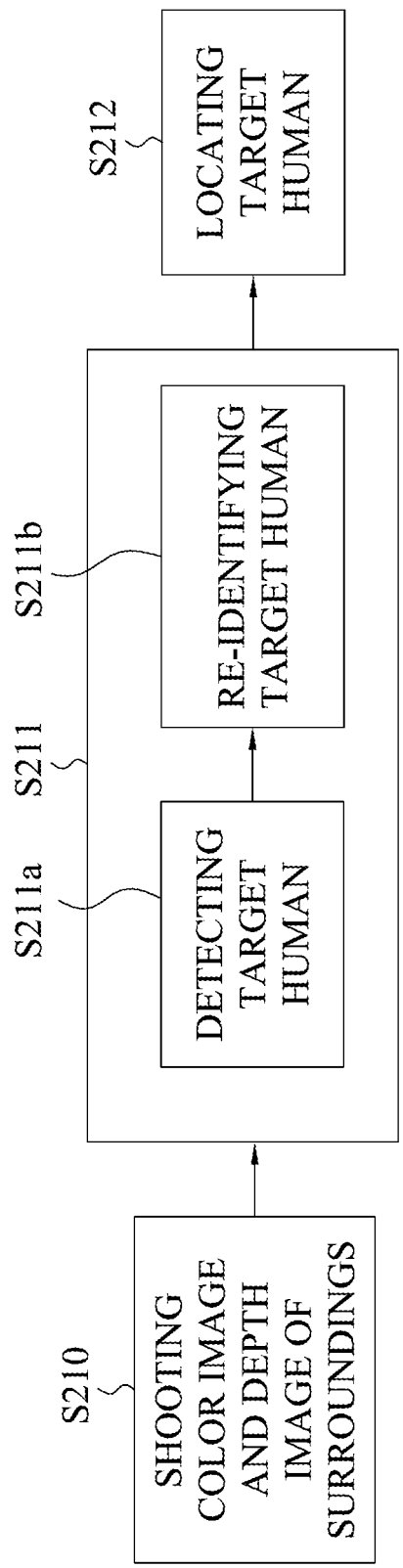
FIG. 2B is a flowchart of a controlling method of a robot illustrated according to one embodiment of this disclosure.

FIG. 2B is a flowchart of a controlling method of a robot illustrated according to one embodiment of this disclosure. More specifically, the flowchart of FIG. 2B illustrate additional operations included in the operation 211 in the FIG. 2A according to one or more embodiments.

As illustratively shown in FIG. 2B, in some embodiments, the operation S211 includes operation S211a and operation S211b. At operation S211a, the robot 100 performs detection to the target human by the detecting device 110. At operation S211b, the robot 100 performs re-identification to the target human by the detecting device 110 and the controlling device 120.

Figure 3:
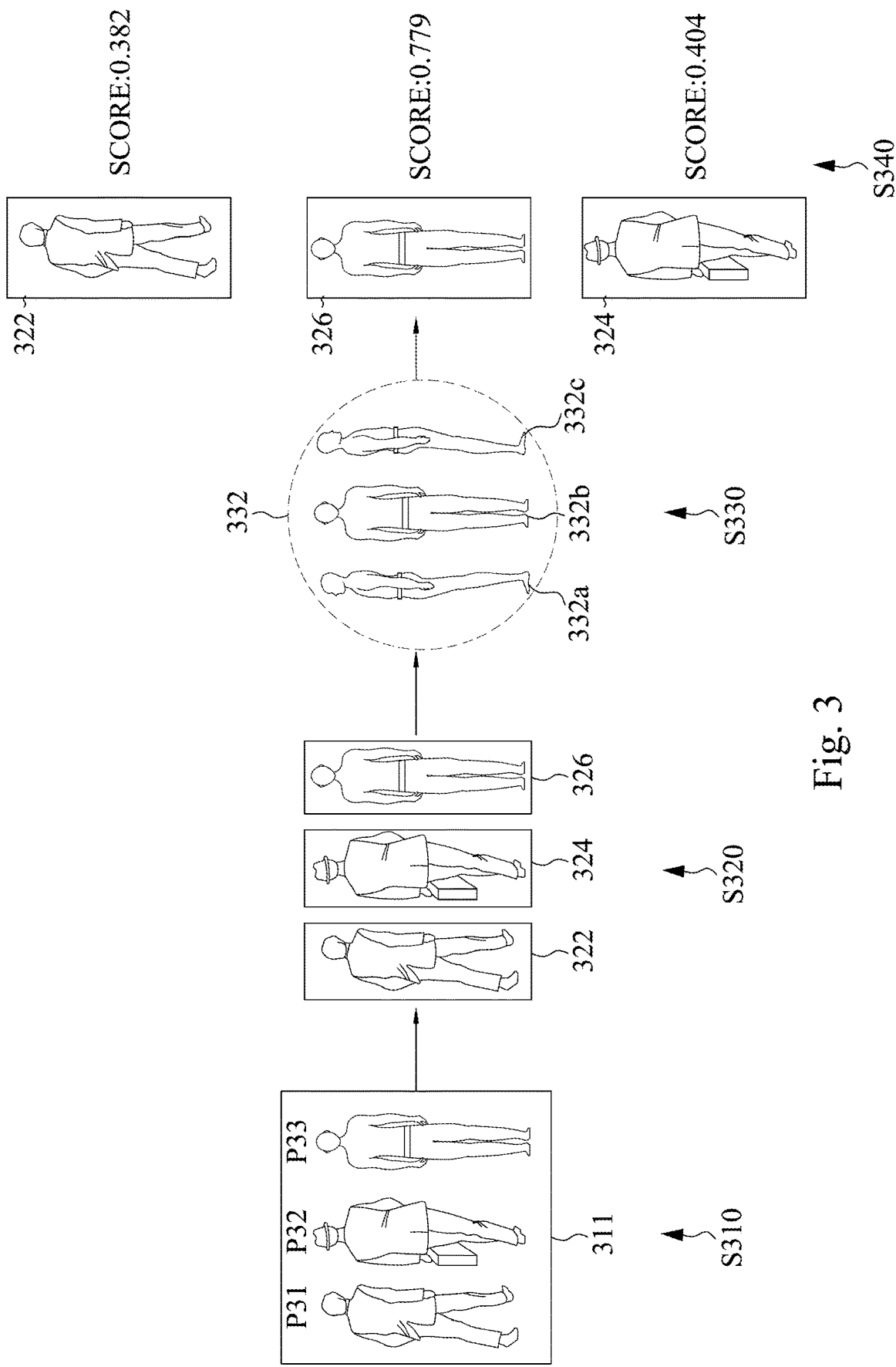
FIG. 3 is a flowchart of detecting a target human illustrated according to one embodiment of this disclosure.

As illustratively shown in FIG. 3, in some embodiments, the robot 100 follows the target human P33 behind the target human P33, and thus the detecting device 110 is able to detect a backside image of the target human P33 only. Since characteristics of the backside image for identification are fewer, and the image of the target human P33 may be effected by circumstance light, a facing toward direction and a pose of the target human P33, so the robot 100 needs to re-identify the target human P33 under effects of various factors at operation S211b. In some embodiments, the operation S211b includes implementing the re-identification of the target human P33 by open source Re-ID deep learning neural network.

FIG. 3 is a flowchart of detecting a target human illustrated according to one embodiment of this disclosure. Operations S310, S320, S330 and S340 in FIG. 3 are included in the operation S211 in some embodiments.

At operation S310, the detecting device 110 shoots a surrounding circumstance to obtain an image 311. The surrounding circumstance includes human P31, P32 and a target human P33.

At operation S320, the controlling device 120 frames images 322, 324 and 326 corresponding to the human P31, P32 and a target human P33, respectively, from the image 311. In some embodiments, the operation S320 frames various candidate humans on the image 311 by a deep neural network, and categorize the image in each of the candidate frames according to weights trained in advance to frame the images 322, 324 and 326 of existing humans. In some embodiments, the boundaries of the images 322, 324 and 326 are referred as bounding boxes.

At operation S330, the controlling device 120 compares the images 322, 324 and 326 with images of the target human P33 stored in the database 332, such as images 332a, 332b and 332c. In some embodiments, the controlling device 120 includes the database 332.

At operation S340, the controlling device 120 performs calculation to characterize the images 322-326 and the images 332a-332c to obtain respective similarity scores corresponding to the images 322-326, to identify a image corresponding to the target human P33 from the images 322-326. In the embodiment illustratively shown in FIG. 3, the similarity scores of the images 322-326 are 0.382, 0.404 and 0.779, respectively. The similarity score corresponding to the image 326 is the highest, and thus the image 326 is determined as the image corresponding to the target human P33.

Figure 4:
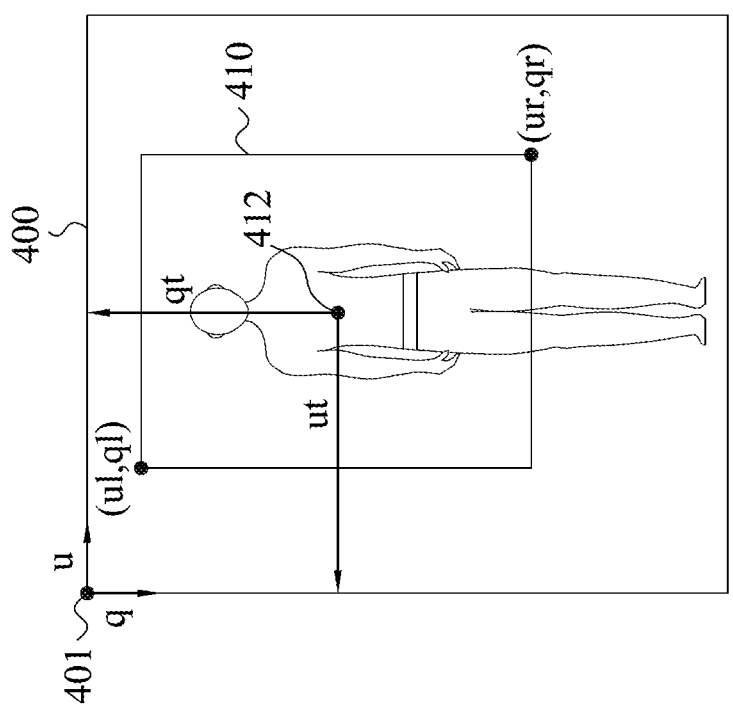
FIG. 4 is a schematic diagram of locating a target human illustrated according to one embodiment of this disclosure.

As illustratively shown in FIG. 2A, at operation S212, the controlling device 120 locates the target human detected by the detecting device 110. FIG. 4 is a schematic diagram of locating a target human illustrated according to one embodiment of this disclosure. FIG. 4 illustrates operations included in the operation S212 in some embodiments.

As illustratively shown in FIG. 4, in some embodiments, the controlling device 120 frames a bounding box 410 corresponding to a target human P41 according to depth image information detected by the detecting device 110. A center point 412 of the bounding box 410 is defined as a two dimensional coordinate Puq of the target human P41 in an image 400, in which:

$$Puq=[ut,qt,1]^T;$$

$$ut=(ul+ur)/2;$$

$$qt=ql+(qr-ql)/b.$$

The upper left corner of the image 400 is the origin 401 of an (u,q) coordinate system. A coordinate value (ut, qt) is a coordinate value of the center point 412. Coordinate values (ul, ql) and (ur, qr) are coordinate values of the upper left corner and the lower right corner of the bounding box 410, respectively. A proportional constant b is for determining a position of the target human P41 in the vertical direction.

In some embodiments, the controlling device 120 is configured to convert the two dimensional coordinate Puq to a three dimensional coordinate Pxyz to complete the locating to the target human P41. Coordinates xt, yt and zt are the coordinates of the target human P41 in x-direction, y-direction and z-direction, respectively, in which $$Pxyz=[xt,yt,zt]^T.$$

In some embodiments, the controlling device 120 is configured to assort the two dimensional coordinate Puq with internal parameters of the camera to project the two dimensional coordinate Puq to the three dimensional coordinate Pxyz by a basic pinhole camera model.

Figure 5:
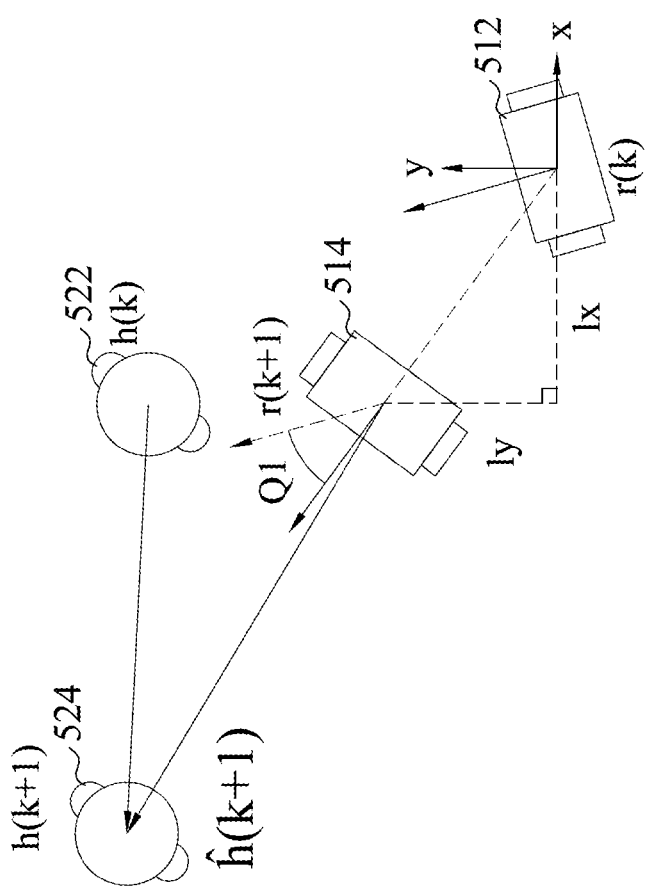
FIG. 5 is a schematic diagram of estimating and tracking coordinates of a target human illustrated according to one embodiment of this disclosure.

As illustratively shown in FIG. 2A, at operation S213, the controlling device 120 estimates a coordinate of the target human in future according to the target human coordinate calculated at operation S212. FIG. 5 is a schematic diagram of estimating and tracking coordinates of a target human illustrated according to one embodiment of this disclosure. FIG. 5 illustrates operations included in the operation S213 in some embodiments.

As illustratively shown in FIG. 5, a robot 512 is an embodiment of the robot 100 at an instant k, a robot 514 is an embodiment of the robot 100 at a instant (k+1). In some embodiments, target humans 522 and 524 are a same target human at the instant k and the instant (k+1), respectively.

In some embodiments, position coordinates of the robots 512 and 514 are coordinates r(k) and r(k+1), respectively. An angle Q1 is represented as an angle difference between directions of the robots 512 and 514 facing toward. Distance components lx and ly are represented as position differences of the robots 512 and 514 in x-direction and y-direction, respectively. The relationship between the coordinates r(k) and r(k+1) can be represented by a transformation matrix W(k) as following:

$$r(k+1) = W(k) \times r(k);$$

$$r(k) = [xr(k), yr(k), 1, 1]^T;$$

$$W(k) = \begin{bmatrix} \cos(Q1) & -\sin(Q1) & 0 & lx \\ \sin(Q1) & \cos(Q1) & 0 & ly \\ 0 & 0 & 1 & 0 \\ 0 & 0 & 0 & 1 \end{bmatrix};$$

$$Q1 = \omega r \times t1;$$

$$lx = vr \times t1 \times \sin(Q1);$$

$$ly = vr \times t1 \times \cos(Q1);$$

The coordinates xr(k) and yr(k) are the coordinate of the robot 512 in x-direction and y-direction, respectively. The velocity yr and the angular velocity ωr are the velocity and the angular velocity of the robot 512 at the instant k. The time t1 is the time variation from the instant k to the instant (k+1).

In some embodiments, the position coordinates of the target humans 522 and 524 are represented as h(k) and h(k+1), respectively. The coordinates of the target human 522 in x-direction and y-direction are represented as xh(k) and yh(k), respectively. The velocity components of the target human 522 in x-direction and y-direction are represented as vhx and vhy, respectively. The relationship between the coordinates h(k) and h(k+1) can be represented as following:

$$h(k)=[xh(k),yh(k),1,1]^T;$$

$$h(k)=[xh(k+1),yh(k+1),1,1]^T;$$

$$xh(k+1)=xh(k)+vhx \times t1;$$

$$yh(k+1)=yh(k)+vhy \times t1.$$

In some embodiments, the robots 512 and the target human 522 are in a dynamic state, and thus the corresponding coordinates r(k) and h(k) change continuously. In order to estimate a position of the target human at a next instant, the controlling device 120 estimates h(k+1) by the transformation matrix W(k) as following:

$$\hat{h}(k+1)=W^{-1}(k) \times h(k+1);$$

The coordinate value ĥ(k+1) is a coordinate transformed from h(k+1) by an Extended Kalman filter.

In some embodiments, the controlling device 120 estimates the coordinate of the target human 524 by updating and correcting the Extended Kalman filter continuously. In some embodiments, when the target human 524 is deviated from a detecting range of the detecting device 110 or when the target human 524 is blocked by other objects, the robot 514 can move according to the estimated coordinate value ĥ(k+1) to follow the target human 524. The robot 514 can also identify the target human 524 according to the estimated coordinate value h(k+1) and distinguish the target human 524 and other humans detected by the detecting device 110.

Figure 6:
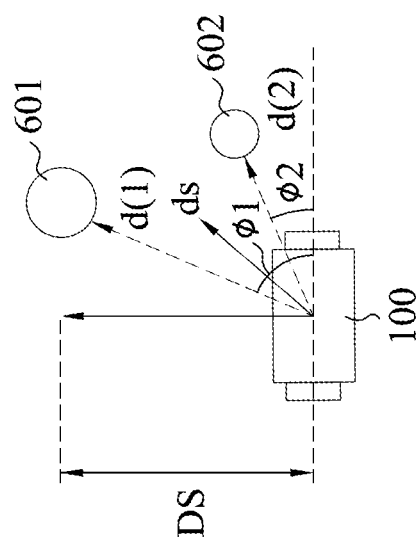
FIG. 6 is a schematic diagram of detecting obstacles illustrated according to one embodiment of this disclosure.

As illustratively shown in FIG. 2A, at operation S220, the controlling device 120 detects obstacles according to the images shot at operation S210. FIG. 6 is a schematic diagram of detecting obstacles illustrated according to one embodiment of this disclosure. FIG. 6 illustrates operations included in the operation S220 in some embodiments.

As illustratively shown in FIG. 6, in some embodiments, the surrounding circumstance of the robot 100 includes an obstacle 601 at an azimuth φ1 and an obstacle 602 at an azimuth φ2. In some embodiments, the detecting device 110 detects a vector Ob(i,j) between the robot 100 and points on an obstacle at an azimuth φi. The numbers i and j are integer numbers. Different j correspond to different points on the obstacle at the azimuth φi.

Figure 7:
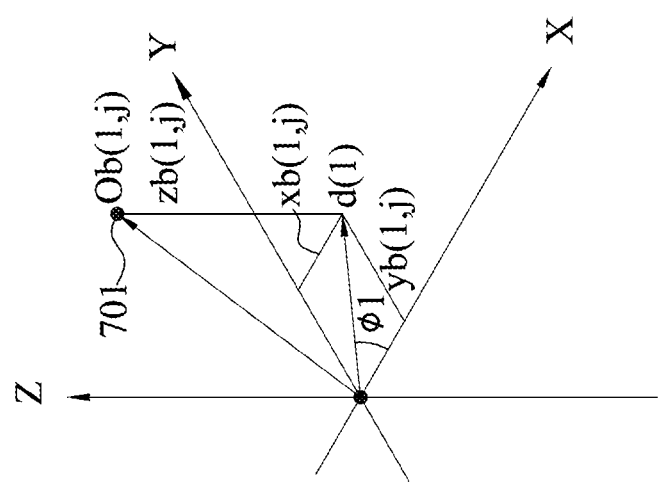
FIG. 7 is a schematic diagram of a 3-dimensional vector projection illustrated according to one embodiment of this disclosure.

In some embodiments, the vector Ob(i,j) includes three dimensional information. The controlling device 120 is configured to convert the vector Ob(i,j) to two dimensional information to program a motion of the robot 100. FIG. 7 is a schematic diagram of a 3-dimensional vector projection illustrated according to one embodiment of this disclosure. As illustratively shown in FIG. 7, a point 701 is a point on the obstacle at the azimuth φi. The point 701 corresponds to the vector Ob(i,j). Reference is made to FIG. 6 and FIG. 7. A jth point which minimize the vector Ob(i,j) is selected as a point representing the obstacle 601. A vector d(i) is a projection of the vector Ob(i,j) on the x-y plane which is the plane that robot 100 moves along. A specific projecting method uses a projecting matrix A. For the jth point on the obstacle at the azimuth φi, corresponding equations are:

$$Ob(i,j) = [xb(i,j), yb(i,j), zb(i,j)];$$

$$A = \begin{bmatrix} 1 & 0 \\ 0 & 1 \\ 0 & 0 \end{bmatrix};$$

$$d(i) = Ob(i, j) \times A, \quad j = \arg\min_l (|Ob(i, l)|).$$

If a length of the vector d(i) between the obstacle at the azimuth φi and the robot 100 is decreased, then a probability of a collision occurring is increased. A vector ds representing the circumstance obstacles is generated by summing probabilities of collisions with obstacles in every azimuth. The robot 100 has a collision occurring probability in a direction of the vector ds higher than other directions. The robot 100 is configured to dodge to prevent the collision. The controlling device drives the robot 100 to dodge according to the vector ds. An equation of the vector ds is following:

$$ds = |de| \sum_i \left[ \left(1 - \frac{d(i)}{DS}\right)^{a1} \times \left(\frac{d(i)}{|d(i)|}\right) \right];$$

As illustratively shown in FIG. 6, the safe distance DS corresponds to a safe distance when the robot 100 performs an obstacle dodging action. If a distance between an obstacle and the robot 100 is larger than the safe distance DS, then the obstacle will not affect the robot 100, and thus the obstacle will not be included in the calculation. In order to decrease effects of obstacles at longer distances, a1 is set as an exponent smaller than 1. The vector de is a vector corresponding to an obstacle having a shortest distance to the robot 100. For example, there are only two obstacles in the embodiment illustrated in FIG. 6. An absolute value of the vector d(2) is smaller than an absolute value of the vector d(1). Thus, in the embodiment illustrated in FIG. 6, the vector d(2) is referred as the vector de in the equation described above.

In the embodiment illustrated in FIG. 6, the robot 100 calculates according to the vector d(1) corresponding to the obstacle 601 and the vector d(2) corresponding to the obstacle 602 to obtain the vector ds, and performs an obstacle dodging action according to the vector ds.

As illustratively shown in FIG. 2A, at operation S230, the robot 100 following the target human and dodging the obstacles simultaneously according to the target human identified at operation S213 and the vector ds calculated at operation S220. FIG. 8 is a schematic diagram of a robot following the target human and dodging the obstacle simultaneously illustrated according to one embodiment of this disclosure. FIG. 8 illustrates operations included in the operation S230 in some embodiments.

As illustratively shown in FIG. 8, the robot 100 follows the target human P33 and dodges an obstacle 801 simultaneously. In some embodiments, the controlling device 120 generates parameters Fa and Fr according to the vector between the target human P33 and the robot 100, and the vector ds of the obstacle 801, such that the robot 100 moves according to the parameters Fa and Fr. The target human P33 has an attractive force to the robot 100, and the obstacle 801 has a repulsive force to the robot 100, such that the robot 100 can follow the target human P33 and dodge an obstacle 801 simultaneously.

In order to simplify descriptions, the embodiment illustrated in FIG. 8 includes only one obstacle, that is, the obstacle 801. Thus, the vector ds is the vector between the obstacle 801 and the robot 100. In some other embodiments, the vector ds is calculated according to coordinates of more obstacles. For example, the vector ds is calculated according to the coordinates of the obstacles 601 and 602 in the embodiment illustrated in FIG. 6.

In some embodiments, a coordinate of the robot 100 is referred as a coordinate CR, and a coordinate of the target human P33 is referred as a coordinate CP. A vector between the robot 100 and the target human P33 is referred as a vector VPR. A collision radius of the robot 100 is referred as a distance D0. Parameters ka and kr are configured to adjust values of the parameters Fa and Fr. The parameters Fa and Fr can be formulated as following:

$$Fa = -ka \times (CR - CP) = -ka \times VPR;$$

$$Fr = \begin{cases} kr \times \left(\frac{1}{|ds|} - \frac{1}{D0}\right) \times \frac{1}{|ds|^2} \times \frac{ds}{|ds|}, & \text{if } |ds| \leq D0. \\ 0, & \text{if } |ds| \geq D0 \end{cases}$$

The equation of the parameter Fr represents that when the distance |ds| (i.e. the absolute value of the vector ds) is decreased, the parameter Fr is increased and rise exponentially. In contrast, when the distance |ds| is larger than the distance D0, the obstacle 801 doesn't affect the robot 100. The coordinates CR, CP and the vector ds are referred as two dimensional vectors, and thus the parameters Fa and Fr are also referred as two dimensional vectors.

In some embodiments, the controlling device 120 sums the parameters Fa and Fr directly to obtain a resultant force parameter Ft1:

$$Ft1 = Fa + Fr.$$

In some embodiments, the controlling device 120 obtains a weighting parameter Gf according to an angle value Q2 between the vector VPR and a direction DR which the robot 100 faces toward. The vector VPR is the vector between the robot 100 and the target human P33. The controlling device 120 calculates a resultant force parameter Ft2 according to the weighting parameter Gf, the parameters Fa and Fr as following:

$$Gf = a2 \times |Q2|/\pi;$$

$$Ft2 = (1+Gf) \times Fa + (1-Gf) \times Fr;$$

π is the circular constant. The number a2 is a positive real number which is configured to adjust the weighting parameter Gf. In some embodiments, the parameter (1+Gf)×Fa corresponds to a human following action of the robot 100 following the target human P33, and the parameter (1−Gf)×Fr corresponds to an obstacle dodging action of the robot 100 dodging obstacles. In other words, in some embodiments, in a moving action of the robot 100, the parameter (1+Gf)×Fa corresponds to a weight of the human following action, and the parameter (1−Gf)×Fr corresponds to a weight of the obstacle dodging action.

According to equations related to the resultant force parameter Ft2 and the weighting parameter Gf described above, in some embodiments, an effect of the parameter Fa to the resultant force parameter Ft2 is proportional to the angle value Q2, and an effect of the parameter Fr to the resultant force parameter Ft2 is inversely proportional to the angle value Q2. In some embodiments, when the weighting parameter Gf is increased, the parameter (1+Gf)×Fa corresponding to the human following action is increased and the parameter (1−Gf)×Fr corresponding to the obstacle dodging action is decreased. In contrast, in some embodiments, when the weighting parameter Gf is decreased, the parameter (1+Gf)×Fa corresponding to the human following action is decreased and the parameter (1−Gf)×Fr corresponding to the obstacle dodging action is increased. In other words, the weight of the obstacle dodging action of the robot 100 is inversely proportional to the angle value Q2, and the weight of the human following action of the robot 100 is proportional to the angle value Q2. In some embodiments, actions of the robot 100 is adjusted by the weighting parameter Gf, such that the robot 100 is able to return a rear of the target human P33 rapidly to continue the human following action after dodging the obstacles. Besides the equations described above, other methods of effecting the moving action (such as a moving direction and/or a moving velocity) of the robot 100 by adjusting the resultant force parameter Ft2 according to the angle value Q2 are contemplated as being within the scope of the present disclosure. In some embodiments, in order to prevent the resultant force parameter Ft2 being too large, the weighting parameter Gf is restricted to be smaller than one.

As illustratively shown in FIG. 2A, at operation S240, the controlling device 120 is configured to control the motion of the robot 100 according to the resultant force parameter Ft2 calculated at operation S230. For example, in some embodiments, the controlling device 120 is configured to generate a driving command corresponding to the resultant force parameter Ft2 according to the resultant force parameter Ft1 and the angle value Q2. The mobile device 130 is configured to perform the driving command of the controlling device 120 for the robot 100, to enable the robot 100 dodging the obstacle 801 and following the target human P33 simultaneously. As described above, in a moving action performed by the robot 100 according to the driving command, a weight of the obstacle dodging action in the moving action is inversely proportional to the angle value Q2 and the weighting parameter Gf, such as the parameter (1−Gf)×Fr, and a weight of the following action in the moving action is proportional to the angle value Q2 and the weighting parameter Gf, such as the parameter (1+Gf)×Fa.

In some embodiments, the controlling device 120 is configured to drive the mobile device 130 according to the resultant force parameter Ft2 to adjust a linear velocity Vf and an angular velocity ωf. At first, a velocity VR and corresponding velocities such as a velocity component VRx in x-direction, a velocity component VRy in y-direction, a linear velocity Vc and an angular velocity ωc, according to the resultant force parameter Ft2, a mass MR of the robot 100 and a time interval dt as following:

$$VR = [VRx, VRy] = Ft2 \times dt/MR;$$

$$Vc = VRx \times b1;$$

$$\omega c = \tan^{-1}(VRy/VRx) \times |VR| \times c1;$$

The number b1 is a constant. The number c1 is a coefficient number. The unit of the number c1 is one over the length unit.

In some embodiments, a safe distance Dse is assigned between the robot 100 and the target human P33. When a distance DRH between the robot 100 and the target human P33 is larger than a buffering distance Dss, the linear velocity Vf is substantially equal to the linear velocity Vc described above. When the distance DRH between the robot 100 and the target human P33 is smaller than the buffering distance Dss, the linear velocity Vf is decreased linearly to keep the distance DRH between the robot 100 and the target human P33 being larger than or equal to the safe distance Dse. That is:

$$Vf = \begin{cases} \frac{(DRH - Dse)}{Dss} \times Vc, & \text{if } 0 \leq DRH < Dss \\ Vc, & \text{if } DRH \geq Dss \end{cases}.$$

Similarly, in some embodiments, when the angle value Q2 between a vector VPR and a direction DR is larger than a buffering angle Qss, the angular velocity ωf is substantially equal to the angular velocity ωc described above. The vector VPR is the vector between the robot 100 and the target human P33. The direction DR is the direction that the robot 100 faces toward. When the angle value Q2 is smaller than the buffering angle Qss and distance DRH is smaller than the buffering distance Dss, the angular velocity ωf is decreased linearly. That is:

$$\omega f = \begin{cases} \frac{Q2}{Qss} \times \omega c, & \text{if } Q2 < Qss \text{ and } 0 \leq DRH < Dss \\ \frac{Q2}{|Q2|} \times \omega c, & \text{if } Q2 > Qss \end{cases}.$$

In some embodiments, the robot 100 performs operations according to the equations related to the linear velocity Vf and the angular velocity ωf, such that the motion of the robot 100 is smoother. In some embodiments, the robot 100 performs calculation according to a double wheel differential motion model to obtain velocities corresponding to a left wheel and a right wheel of the mobile device 130.

As illustratively shown in FIG. 2A, at operation S250, the robot 100 moves according to the linear velocity Vf and the angular velocity ωf calculated at operation S240.

Figure 9:
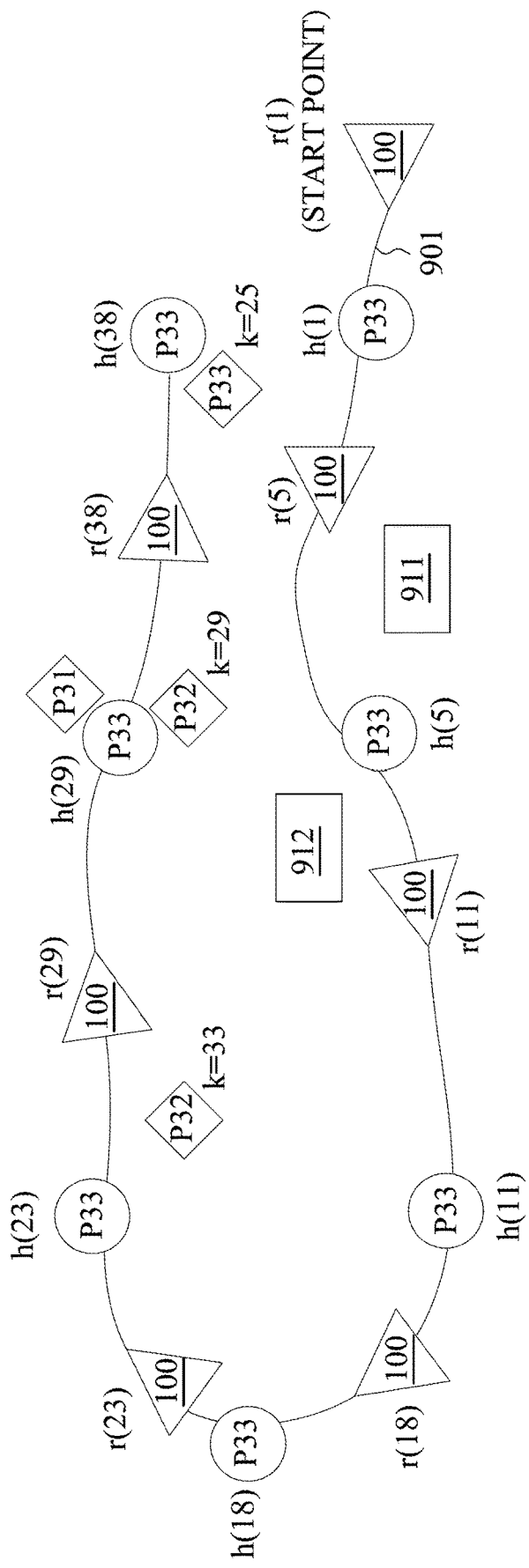
FIG. 9 is a locus diagram of a robot following a target human and dodging an obstacle simultaneously illustrated according to one embodiment of this disclosure.

FIG. 9 is a locus diagram of a robot following a target human and dodging an obstacle simultaneously illustrated according to one embodiment of this disclosure. As illustratively shown in FIG. 9, in some embodiments, a locus 901 is a moving locus formed when the robot 100 following the target human P33. Triangles in FIG. 9 represent positions of the robot 100 at different instants k, and coordinates r(k) correspond to coordinates of the robot 100 at the different instants k. Circles represent positions of the target human P33 at the different instants k, and coordinates h(k) correspond to coordinates of the target human P33 at the different instants k. Diamonds represent humans other than the target human P33, such as humans P31 and P32. Rectangles represent obstacles 911 and 912. In some embodiments, r(1) and h(1) correspond to start points of the robot 100 and the target human P33, respectively.

Figure 10:
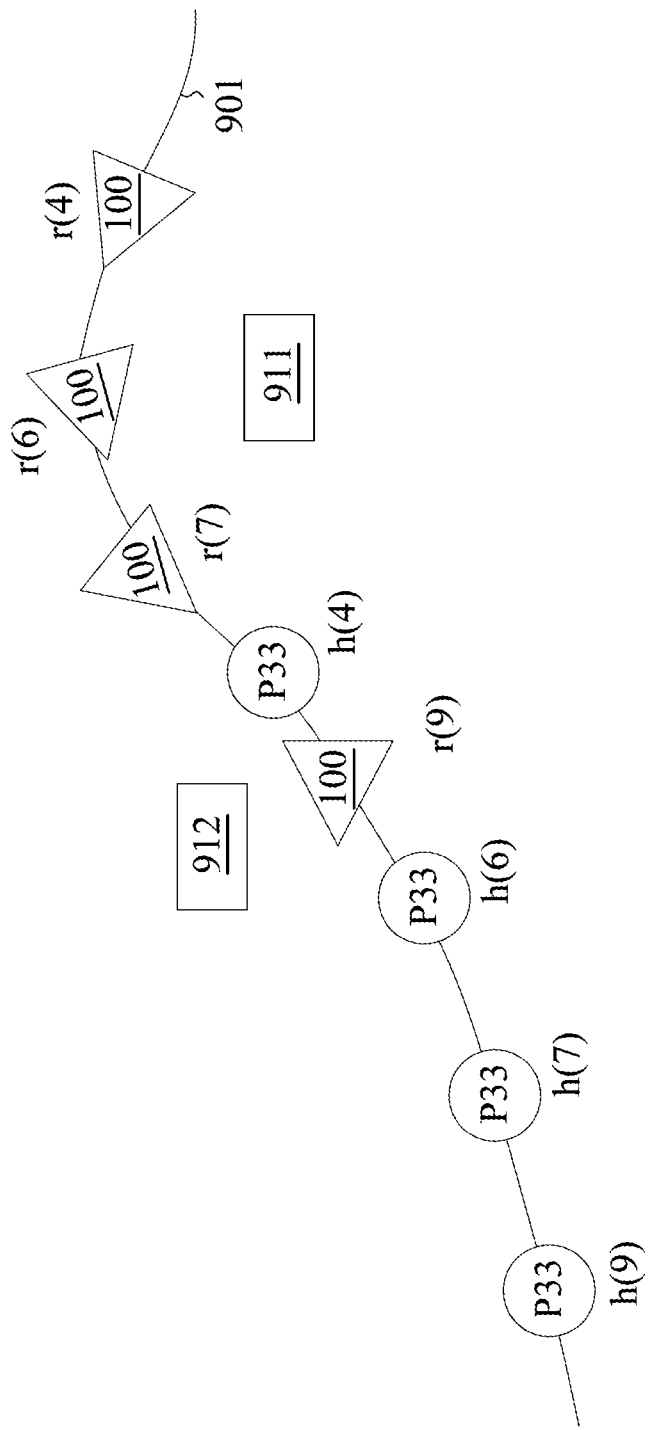
FIG. 10 is a locus diagram of a robot following a target human and dodging an obstacle simultaneously illustrated according to one embodiment of this disclosure.

FIG. 10 is a locus diagram of a robot following a target human and dodging an obstacle simultaneously illustrated according to one embodiment of this disclosure. FIG. 10 corresponds to the moving locus of the robot 100 and the target human P33 from the instant k=4 until the instant k=9 (noted as the instants k=4-9 for brevity) illustrated in FIG. 9. Reference is made to FIG. 9 and FIG. 10. During the instants k=4-9, the controlling device generates corresponding parameter Fr according to positions of the obstacles 911 and 912 to drive the robot 100, such that the moving directions of the robot 100 and the target human P33 are different. However, the robot 100 moves according to the weighting parameter Gf, such that the robot 100 is able to return to the rear of the target human P33 and keep following.

Figure 11:
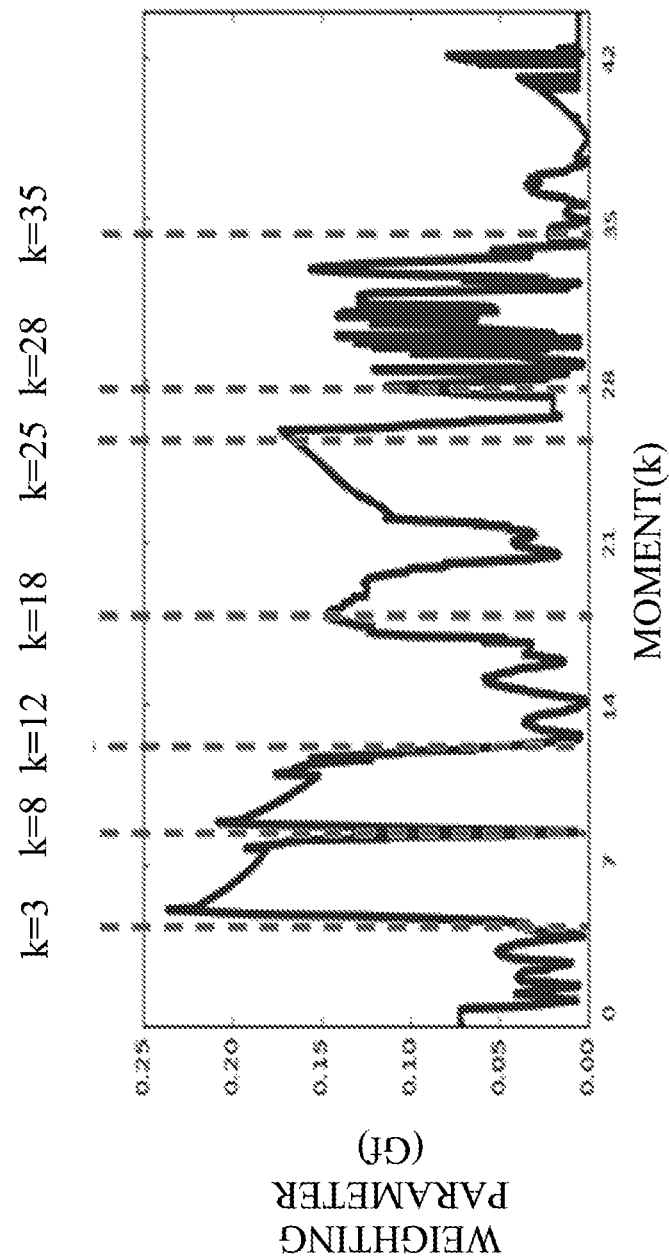
FIG. 11 is a numerical variation diagram of a weighting parameter when a robot follows a target human illustrated according to one embodiment of this disclosure.

FIG. 11 is a numerical variation diagram of a weighting parameter when a robot follows a target human illustrated according to one embodiment of this disclosure. A horizontal axis of FIG. 11 corresponds to the instant k. A vertical axis of FIG. 11 corresponds to the weighting parameter Gf which affects the motion of the robot 100. In the embodiment illustrated in FIG. 11, number a2 is set as two.

Reference is made to FIG. 10 and FIG. 11. At the instant k=1, the robot 100 starts to follow the target human P33. During the instants k=3-8, a moving direction DR of the robot 100 is deviated from the vector VPR between the robot 100 and the target human P33 gradually according to the parameter Fr(k=3-8) due to the obstacle 911, such that the angle value Q2 and the corresponding weighting parameter Gf are increased. When the robot 100 keeps following the target human P33 after the robot 100 dodges the obstacle 911, the weighting parameter Gf is decreased at the instant k=8. During the instants k=8-12, the robot 100 dodges the obstacle 911, but the angle value Q2 and the weighting parameter Gf are increased again due to a blockage of the obstacle 912. When the robot 100 keeps following the target human P33 after the robot 100 dodges the obstacle 912, the weighting parameter Gf is decreased at the instant k=12. At the instants k=18 and k=25, the target human P33 turns and is deviated from the direction DR which the robot 100 moves toward, such that the angle value Q2 and the corresponding weighting parameter Gf are increased. During the instants k=28-35, the detecting device 110 detects the humans P31 and P32, and identifies the target human P33 from the target human P33, the humans P31 and P32, such that the robot 100 keeps following the target human P33. The human P32 moves during the instants k=25-33, such that positions of the human P32 at the instants k=25, k=29 and k=33 are different.

In summary, in the embodiments of the present disclosure, the robot 100 generates the resultant force parameter Ft2 according to the vector VPR, the direction DR and the vector ds. The vector VPR is a vector between the robot 100 and the target human P33. The direction DR is a direction which the robot 100 faces toward. The vector ds is a vector between the robot 100 and the obstacle 801. The robot 100 moves according to the resultant force parameter Ft2, such that the robot 100 dodges the obstacle 801 and follows the target human P33 simultaneously and stably. Furthermore, the robot 100 is able to identify the target human P33 from the image 311 with a number of humans by a deep neural network.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A system of a robot for human following, comprising the robot facing toward a first direction, the robot comprising:
   a detecting device configured to detect a target human and at least one obstacle;
   a controlling device configured to generate a first parameter according to a first vector between the target human and the robot, generate a second parameter according to at least one second vector between the at least one obstacle and the robot, and generate a driving command according to a first resultant force parameter generated by the first parameter and the second parameter and an angle value between the first direction and the first vector to drive the robot; and
   a mobile device configured to perform the driving command of the controlling device for the robot, to enable the robot dodging the at least one obstacle and following the target human simultaneously,
   wherein the controlling device is further configured to adjust an obstacle dodging action of the robot dodging the at least one obstacle and a following action of the robot following the target human according to the first resultant force parameter and the angle value,
   wherein in a moving action performed by the robot according to the driving command, a weight of the obstacle dodging action in the moving action is inversely proportional to the angle value, and a weight of the following action in the moving action is proportional to the angle value.

2. The system of claim 1, wherein the controlling device is further configured to estimate the first vector corresponding to a position at a next instant of the target human according to a present position and a present velocity of the target human, to enable the controlling device tracking and locating the target human continuously.

3. The system of claim 1, wherein the controlling device is further configured to store a database including at least one characteristic image of the target human,
wherein the controlling device is further configured to compare an image detected by the detecting device with the database, to identify the target human in the image.

4. The system of claim 1, wherein the detecting device is further configured to obtain the at least one second vector corresponding to each of the at least one obstacle,
wherein the controlling device is further configured to perform calculation according to a safe distance of the robot performing an obstacle dodging action and the at least one second vector to obtain a third vector corresponding to the at least one second vector, and generate the second parameter according to the third vector, to enable the robot dodging the at least one obstacle according to the third vector.

5. A controlling method of a robot for human following, comprising:
identifying a target human in an image detected by the robot according to a pre-stored database related to the target human;
performing calculation to obtain an angle value between a first direction and a first vector according to the first direction which the robot moving toward and the first vector between the robot and the target human;
performing calculation to obtain a resultant force parameter according to the first vector, the angle value and at least one second vector between at least one obstacle and the robot; and
adjusting a moving action of the robot according to the resultant force parameter and the angle value to enable the robot dodging the at least one obstacle and following the target human simultaneously,
wherein adjusting the moving action of the robot comprises:
adjusting an obstacle dodging action of the robot dodging the at least one obstacle and a following action of the robot following the target human according to the resultant force parameter and the angle value,
wherein in a moving action performed by the robot according to the driving command, a weight of the obstacle dodging action in the moving action is inversely proportional to the angle value, and a weight of the following action in the moving action is proportional to the angle value.

6. The controlling method of claim 5, further comprising:
estimating, when the detecting device is unable to detect the target human, the first vector corresponding to a position at a next instant of the target human according to a present position and a present velocity of the target human, to enable the controlling device tracking and locating the target human continuously.

7. The controlling method of claim 5, further comprising:
detecting each of the at least one obstacle;
obtaining the at least one second vector corresponding to each of the at least one obstacle;
generating a third vector corresponding to the at least one second vector according to a safe distance of the robot performing the obstacle dodging action and the at least one second vector; and
driving the robot according to the third vector to dodge the at least one obstacle.

8. The controlling method of claim 5, wherein identifying the target human in the image detected by the robot comprises:
storing at least one characteristic image of the target human in the pre-stored database; and
comparing the image detected by the robot and the pre-stored database, to identify the target human in the image.

* * * * *